United States Patent [19]

Buckley et al.

[11] Patent Number: 4,949,824
[45] Date of Patent: Aug. 21, 1990

[54] HIGH PRODUCTION, TORQUE LIMITING, ONE-WAY CLUTCH

[75] Inventors: James A. V. Buckley, Whitefish Bay; George H. Hinkens; James J. Dimsey, both of Milwaukee, all of Wis.

[73] Assignee: Hayes Industrial Brake, Inc., Mequon, Wis.

[21] Appl. No.: 216,795

[22] Filed: Jul. 8, 1988

[51] Int. Cl.⁵ .................. F16D 7/06; F16D 13/75; F16D 55/14; F16D 65/56
[52] U.S. Cl. .................. 192/45; 192/48.92; 188/71.2; 188/196 D
[58] Field of Search .................. 192/45, 48.3, 48.92, 192/56 R; 464/30, 37; 188/71.2, 71.9, 72.7, 196 D

[56] References Cited

U.S. PATENT DOCUMENTS

| | | | |
|---|---|---|---|
| 2,211,053 | 8/1940 | Critchfield | 192/45 |
| 2,926,765 | 3/1960 | Heid | 192/48.92 |
| 3,031,052 | 4/1962 | Blinder | 192/45 |
| 3,072,234 | 1/1963 | Maurice et al. | 192/48.92 |
| 3,187,598 | 6/1965 | Hennessey et al. | 192/48.92 |
| 3,685,621 | 8/1972 | Gulick et al. | 192/45 |
| 3,825,100 | 7/1974 | Freeman | 188/71.2 |
| 3,937,312 | 2/1976 | Gehrke | 192/45 |
| 3,965,754 | 6/1976 | Bowcott | 192/45 |
| 4,088,206 | 5/1978 | Garrett et al. | 188/196 D |
| 4,164,272 | 8/1979 | Neuman | 188/196 D |
| 4,548,316 | 10/1985 | Maurer | 192/48.92 |
| 4,660,698 | 4/1987 | Miura | 192/45 |

Primary Examiner—Leslie A. Braun
Assistant Examiner—Nicholas Whitelaw
Attorney, Agent, or Firm—Foley & Lardner

[57] ABSTRACT

A torque limiting one-way clutch assembly including a bearing housing having a central bore and a number of grooves around the bore, each groove including a recess at one end, a ramp inclined toward the recess, a roller in each of the grooves, a spring assembly mounted on one end of the housing, the spring assembly including a flexible member extending into each of the grooves for bearing the rollers towards the recess, and a torque ring mounted on the outside surface of bearing housing and having an internal diameter smaller than the bearing housing to provide a frictional fit between the torque ring and the outside surface of the bearing housing.

10 Claims, 4 Drawing Sheets

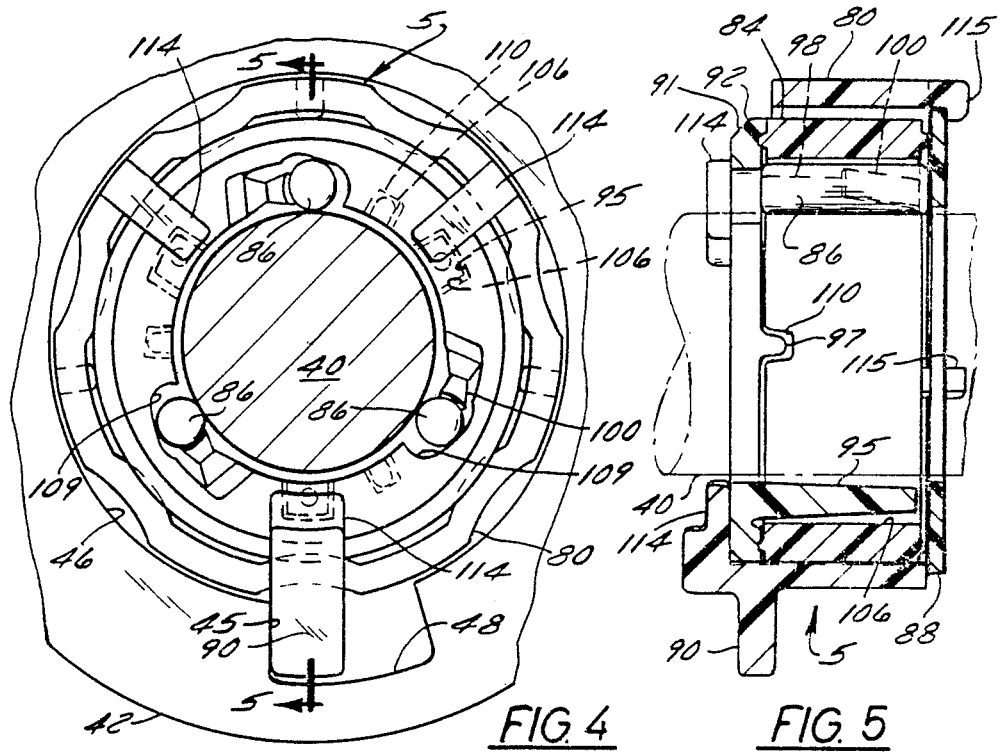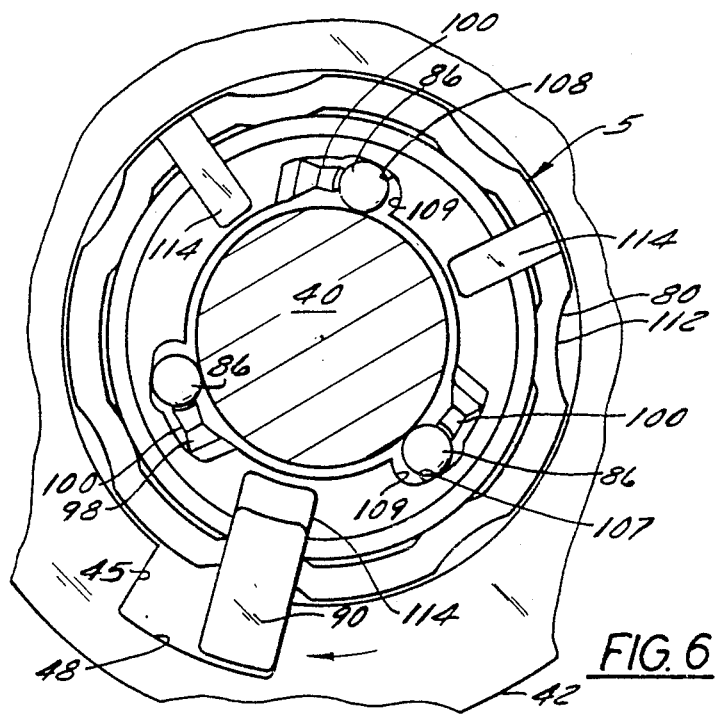

4,949,824

HIGH PRODUCTION, TORQUE LIMITING, ONE-WAY CLUTCH

FIELD OF THE INVENTION

The present invention relates to one-way clutches and more particularly to a high production type one-way clutch having a unitary biasing member and a torque limiting ring.

DESCRIPTION OF THE PRIOR ART

In my co-pending application Ser. No. 06/720,952 filed on Apr. 8, 1985 and entitled "Self-Adjusting Caliper", a conventional one-way clutch is described which is used in a self-adjusting type caliper. The one-way clutch is mounted on the end of a threaded shaft where it is used to advance the shaft in incremental amounts relative to a fixed stator to compensate for wear on the brake pads. The one-way clutch is protected from overloads by a star ring which allows the clutch housing to rotate relative to the shaft whenever the torque applied to the clutch exceeds a predetermined load force. However, it has been found that the star ring is itself subject to wear and requires special handling for mounting on the shaft.

SUMMARY OF THE INVENTION

The torque limited, one-way clutch assembly, according to the present invention, is designed for mass production by forming the elements on the clutch so that they can be axially aligned and locked into position.

A principal feature of the invention is the provision of a one piece biasing assembly which is axially aligned in a bearing housing to maintain a bias force on the roller bearing so that they lock instantly on rotation in one direction and are free to roll in the other direction. This construction is simpler than known constructions and provides a more effective response to movements of the shaft relative to the bearing.

Another principal feature of the invention is the combination of a torque limiting ring of wave form which is mounted on the bearing housing to allow for rotation of the torque limiting ring with respect to the bearing housing on predetermined overloads.

Another feature of the invention is the method for assembling the clutch assembly, which is simple and different from known assembling procedures.

Other principal features and advantages of the invention will become apparent to those skilled in the art of and upon review of the following detailed description, claims and drawings.

DESCRIPTION OF THE DRAWINGS

FIG. 4 is an end view of the one-way clutch shown in the neutral position.

FIG. 5 is a view taken on line 5—5 of FIG. 4 showing the rollers in the bearing housing of the one-way, clutch assembly.

FIG. 6 is a view similar to FIG. 4 showing the clutch assembly in the release mode.

Figure 2:
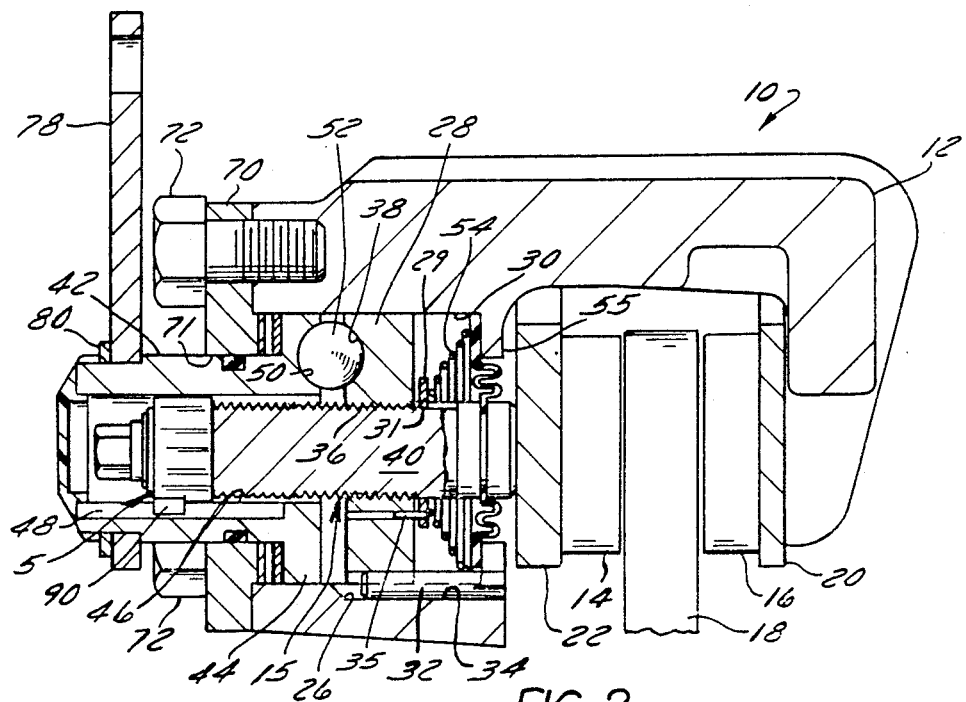
FIG. 2 is a side elevation view in section of the caliper brake assembly showing the torque limited, one-way clutch assembly according to the invention.

Before one embodiment of the invention is explained in detail, it is to be understood that the invention is not limited in its application to the details of construction and the arrangements of components set forth in the following description and illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 1:
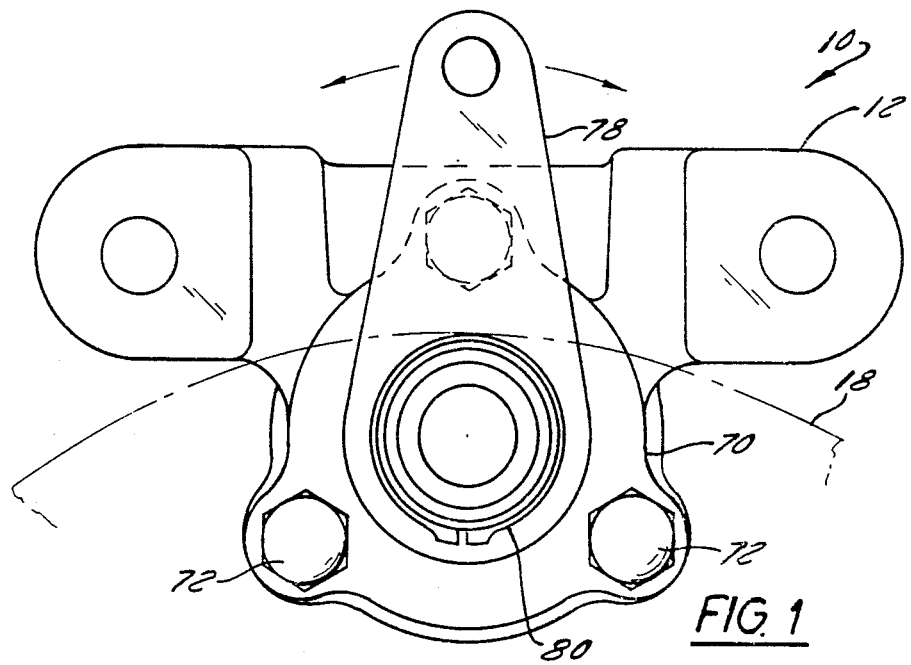
FIG. 1 is an end view of a self-adjusting caliper brake which uses a torque limited one-way clutch assembly according to the invention.

The torque limited, one-way clutch assembly 5, according to the present invention, is used in a floating caliper disc brake 10 of the type shown in FIGS. 1 and 2. The disc brake 10 includes a housing 12 having a pair of brake pads 14 and 16 supported in the housing on the opposite sides of a disc brake rotor 18. The brake pad 16 is mounted on a support plate 20 which is fixed with respect to the housing 12. The brake pad 14 is mounted on a support plate 22 which is supported in the housing 12 for movement toward and away from the disc brake rotor 18. In operation, the movable plate 22 is moved toward the rotor 18 to squeeze the rotor between the brake pads 14 and 16.

The brake pad 14 is moved between operative and inoperative positions by a self-adjusting device 15 which is located within the caliper housing 12. This device generally includes a stator 28 mounted within a bore 30 in the housing 12 for movement toward and away from the brake pad plate 22. The stator 28 is prevented from rotating within the bore 30 by a pin 32 positioned in a slot 34 in the housing and aligned with a notch 26 in the periphery of the stator 28. The stator includes a threaded bore 36 and a number of cam grooves 38 in one face of the stator. The motion of the stator 28 is transferred to the plate 22 by a threaded shaft 40 which is mounted in the threaded bore 36 in the stator 28.

The stator 28 is moved toward the brake support plate 22 by a cylindrical rotor 42 having a radial flange 44 and a central bore 46 having a slot 48 along one side. The rotor 42 is positioned in the bore 30 with the face of flange 44 parallel to and spaced from, the face of the stator 28. The face of flange 44 includes a number of cam grooves 50 which are positioned opposite to the cam grooves 38 in the stator 28. The rotary motion of the rotor 42 is converted to axial motion of the stator 22 by means of a number of balls 52 which are positioned in the cam grooves 38 and 50.

Means are provided for stabilizing the shaft 40 from vibration induced rotation with respect to the stator 28. Such means is in the form of a reaction plate 29 and a thrust spring 54. The reaction plate 29 includes a threaded bore 31 and is pinned to the stator 28 by a pin 35 so that the reaction plate 29 and the stator 28 rotates as a unit on the shaft 40. The stator 28 is biased into engagement with the balls 52 by the thrust spring 54. The thrust force of the spring 54 on the plate 29 and stator 28 also imposes a frictional force on the threads of the shaft 40. The frictional force is sufficient to resist any tendency of the shaft 40 to rotate as a result of vibrations introduced into the clutch assembly.

The rotor is maintained in the bore 30 by means of a cover 70 having a hole 71. The cover is mounted on the housing at the end of the bore 30 and retained thereon by bolts 72. Rotary motion is imparted to the rotor 42 by a lever 78 mounted on the end of the rotor and retained thereon by a snap ring 80.

The amount of rotary motion required to set the brake is determined by the distance the shaft 40 must move to squeeze the pads 14 and 16 against the rotor 18. In the absence of wear, this distance would be constant. However, as the brake pads wear due to frictional engagement with the rotor 18, the amount of motion increases slightly each time the brakes are applied. The screw, therefore, must be advanced an incremental distance each time the cam rollers 52 move beyond the predetermined angular distance of rotation required to seat the pads on the rotor 18.

Figure 3:
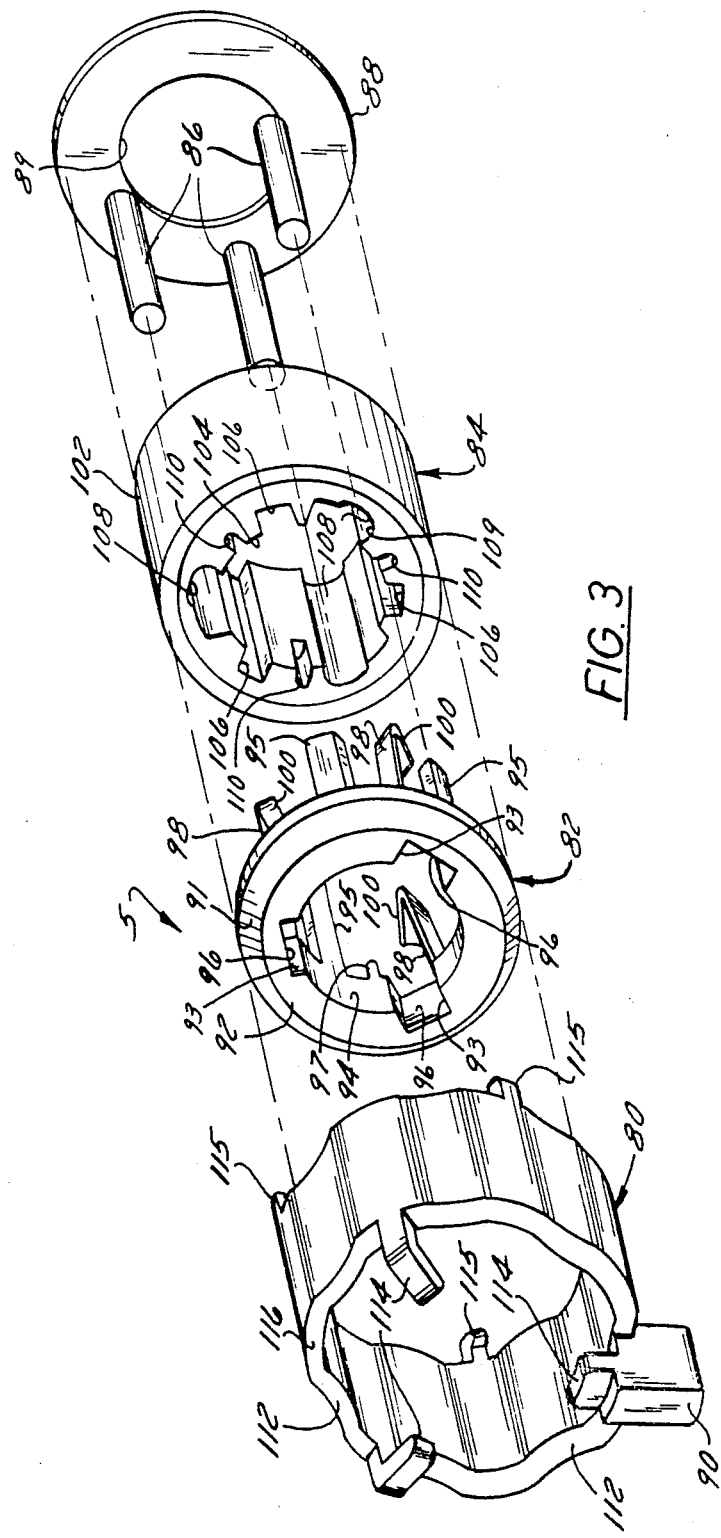
FIG. 3 is an exploded perspective view of the torque limited one-way clutch assembly.

In accordance with the present invention, this is achieved by means of the torque limited, one-way clutch assembly 5 provided on the end of the shaft 40. Referring to FIG. 3, the clutch assembly 5 generally includes a torque limiting friction ring 80, a spring assembly 82, a bearing housing 84, a set of rollers 86 and an end plate 88. When assembled, these parts are positioned in the bore 46 in the rotor 42 with the torque ring 80 connected to a slot 48 in the rotor 42 by means of a tab 90 provided on the torque ring 80.

It should be noted that the slot 48 is substantially wider than the width of the tab 90 to allow for lost motion of the rotor before imparting any rotary motion to the clutch. This initial free motion of the rotor is normally sufficient to move the stator far enough to seat the friction pads 14 and 16 on the disc 18. As the pads wear due to the frictional engagement with the rotor 18, the amount of rotary motion required to seat the pads will increase. When this occurs, continued rotary motion of the rotor will rotate the trailing sidewall 45 of the slot 48 into engagement with the tab 90 on the torque ring 80. The motion of the ring 80 will be transferred to the bearing housing 84 causing the rollers 86 to engage and lock onto the threaded shaft 40 so that the shaft 40 rotates relative to the threaded bore 36 in stator 28. The shaft 40 will thus advance a distance slightly greater than the amount of travel imparted to the stator 28 by the cam action of the rollers 86.

The bearing housing 84 is in the form of a tubular member 102 having a center opening or bore 104 with three equally spaced rectangular slots 106 around the opening 104. Roller pin grooves 108 are provided between the slots 106 at spaced intervals around the opening 104. Each of grooves 108 includes an annular recess 109 at one end and a ramp 107 tapered toward said bore 104. The ramps 107 act to cam the rollers 86 toward the shaft 40 as described hereinafter. Means are provided around the opening or bore 104 for locating the biasing member 82 on the right end of the housing 84. Such means is in the form of a number of slots 110.

In accordance with one aspect of the present invention, the spring assembly 82 is molded as a single unit from a resilient plastic material. As seen in FIG. 3, the spring assembly includes a circular head or cap 92 having a center opening 94, three equally spaced slots 96 around the outside of the opening 94 and a lead chamber 91. Means are provided on the head or cap 92 for biasing rollers 86 toward the recess 109. Such means is in the form of three spring members 98 which extend axially from one side of the head or cap 92. The spring members 98 are aligned with one side 93 of the slots 96. Means are provided on the end of each of the spring members 98 for biasing the rollers toward recess 109. Such means is in the form of a flexible tab 100 provided on the end of members 98.

Means are provided on the head or cap 92 for stabilizing the head 92 on the housing 84. Such means is in the form of a number of rectangular members 95 provided on the same side of the head 92 as the spring members 98. Each of the members 95 is angularly spaced from the spring members 98. Means are also provided on the head 92 for locating the spring assembly 82 on the end of the housing 84. Such means is in the form of a number of fingers 97 formed on the head or cap 92 which corresponds with slots 110 provided in one end of housing 84. The spring assembly 82 cannot be seated on the bearing housing unless the fingers 97 are aligned in the slots 110.

The spring assembly 82 is mounted on the housing 84 by aligning the alignment members 95 with the rectangular slots 106 and the spring members 98 with the roller grooves 108. The head 92 is properly seated on the end of housing 84 when the fingers 97 on the head are seated in the slots 110 in the housing.

Figure 7:
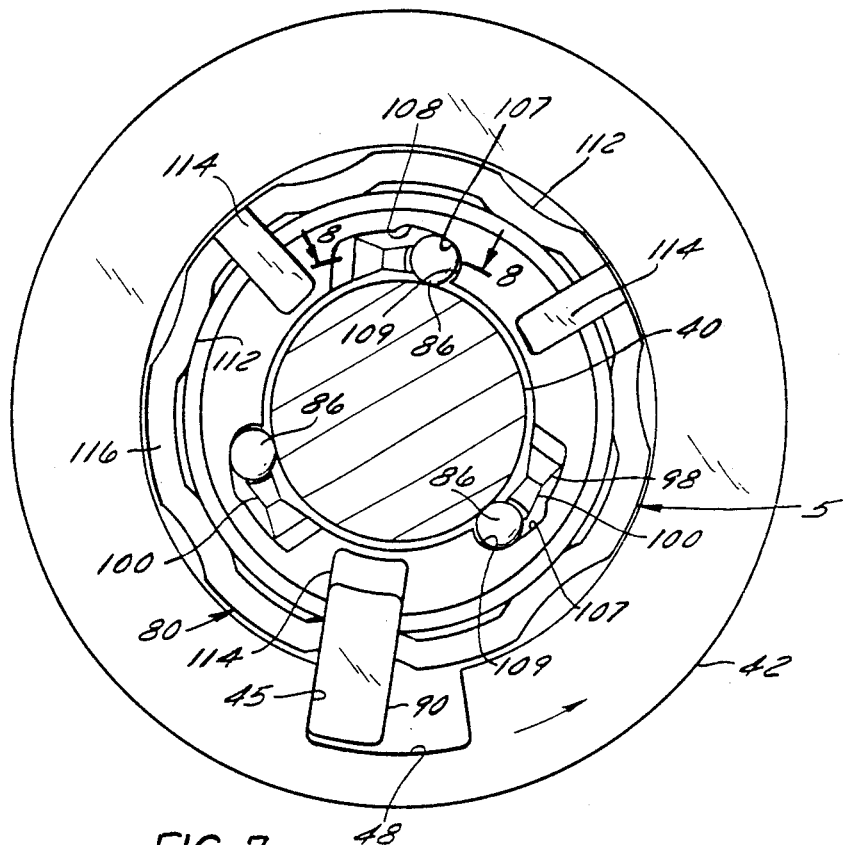
FIG. 7 is a view similar to FIG. 4 showing the clutch assembly in the locked position.
Figure 8:
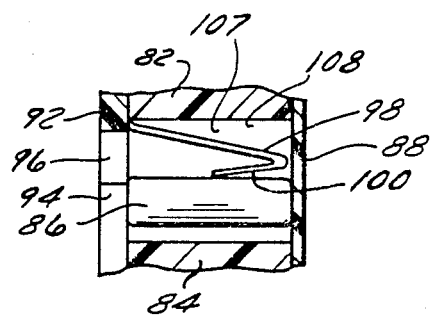
FIG. 8 is a view taken on line 8—8 of FIG. 7 showing the roller in the bearing housing.

The rollers 86 are inserted into the grooves 108 and are biased and retained therein by means of the spring members 98 toward the recesses 109 at the end of the grooves 108. It should be noted in FIG. 7 and 8 that on insertion of the rollers 86 into the grooves 108, the flexible tabs 100 will bias the rollers 86 toward the recesses 109 at the end of the grooves 108. Referring to FIG. 7, it should be noted that the ramps 107 are tapered inwardly toward the shaft 40 so that the rollers 86 will be forced into locking engagement with the shaft 40 on rotation of the housing 84 in a counterclockwise direction.

The torque limited friction drive ring 80 is formed from a resilient plastic material having a number of interior curved surfaces 112 which frictionally engage the outside surface of the bearing housing 84. The ring 80 includes first means in the form of three stop members or tangs 114 at one end means in the form of for holding the cap 92 in the bearing housing 80 and three stop tabs 115 at the other end for locking the end plate 88 on the end of the bearing housing. The inside diameter of the curved surfaces 112 should be small enough to provide a snug fit sufficient to overcome the frictional forces imposed on the shaft 40 by the stator 28 and reaction plate 29 when the bearing housing is rotated to adjust the brake pads. However, when the pads are clamped on the disk, the torque limiting ring should be allowed to slip on the bearing housing.

The torque limited one-way clutch assembly is assembled by seating the spring assembly 82 in the bearing housing 84. The spring assembly 82 and housing 84 are then pushed together until the fingers 97 are seated in the slots 110. The spring assembly 82 and bearing housing 84 are then pushed into the torque ring 80. The lead chamfer 91 on the head 92 of the spring assembly 82 acts as a cam to force the tabs 115 outward so that the bearing housing 84 can be pushed into the torque ring. The spring assembly is seated on the tangs 114 at the end of ring 80. Rollers 86 are then inserted into the grooves 108 against the spring force of the tabs 100 on the members 98. The end plate 88 is inserted from the side under tabs 115 on the torque ring 80 to close the end of the housing 84. The end plate 88 is centered on the housing by the end of shaft 40 which pass through the center hole 89 in plate 88.

It will be understood that the foregoing description is of a preferred exemplary embodiment of the present invention and that the invention is not limited to the specific forms shown. Modifications may be made in design and arrangement thereof within the scope of the present invention, as expressed in the appended claims.

We claim:

1. A torque limiting one-way clutch assembly for transferring rotary motion from a rotor having a central bore to a shaft extending through said bore, said clutch comprising:
    a bearing housing positioned in said central bore, said housing having an outer cylindrical surface, an axial bore and a number of grooves around said axial bore;
    each groove including a ramp inclined toward one end of said groove;
    a roller in each of said grooves;
    a spring assembly mounted on one end of said housing, said spring assembly including means extending into said grooves for biasing said rollers toward said one end; and
    a torque ring mounted on said outside surface of said housing and having an internal diameter smaller than said bearing housing to provide a friction fit between said torque ring and the outside of said bearing housing whereby said bearing housing will slip in said ring when a predetermined torque is applied to said ring.

2. The clutch assembly according to claim 1 wherein said bearing housing includes a number of slots in said bore and said spring assembly includes a number of members corresponding to said slots for preventing rotary motion of said bearing housing with respect to said spring assembly.

3. The clutch assembly according to claim 1 or 2 wherein said torque ring includes a number of longitudinally extending internal curved surfaces whereby said torque ring frictionally engages said bearing housing.

4. The assembly according to claim 1 or 2 wherein said torque ring includes means for holding said spring assembly on said bearing housing.

5. The assembly according to claim 1 or 2 including means for locating said spring assembly on said bearing housing.

6. The assembly according to claim 1 wherein said spring assembly includes a cap for seating said spring assembly on said bearing housing.

7. A one-way clutch assembly for incrementally advancing a shaft in one direction comprising a bearing housing having an axial bore for the shaft,
    said bearing housing including three axially extending grooves equally spaced at predetermined intervals around said bore and three axially extending slots,
    a roller mounted in each groove,
    means on one side of each groove for camming said rollers toward the axis of said bore in said housing,
    a spring assembly mounted on said housing, said spring assembly including a cap for closing one end of said bearing housing, an extension extending into each of said grooves and a flexible tab at the end of each extension for biasing said rollers toward the axis of said bore,
    means extending into said slots for preventing movement between said spring assembly and said bearing housing, and
    means mounted on said bearing housing for retaining said rollers in said grooves.

8. The clutch assembly according to claim 7 including a torque limiting ring mounted on the outside surface of said housing and in frictional engagement therewith whereby said torque ring will slip on said housing whenever a predetermined torque is applied to said housing.

9. The clutch assembly according to claim 7 wherein said torque ring includes first means for holding said spring assembly in said bearing housing and second means for holding said retaining means on said housing.

10. The clutch assembly according to claim 7 including means for locating said spring assembly on said bearing housing.

* * * * *